May 31, 1927.  
E. REYNOLDS  
DEMOUNTABLE RIM  
Filed March 31, 1924  
1,630,636
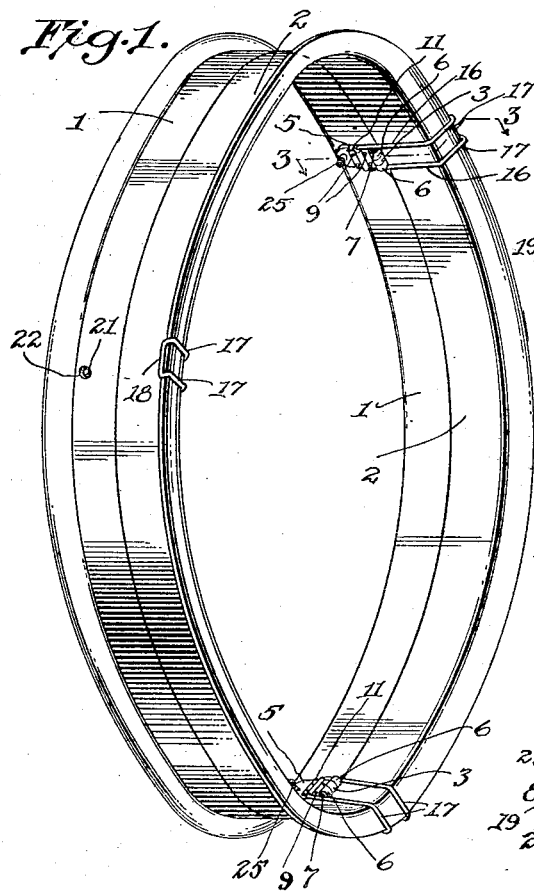
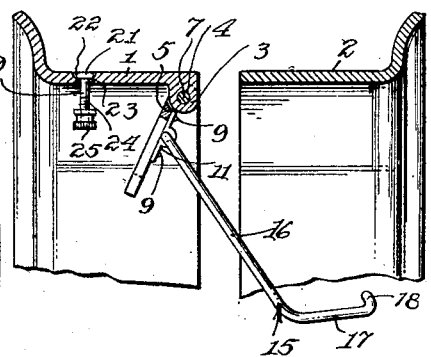
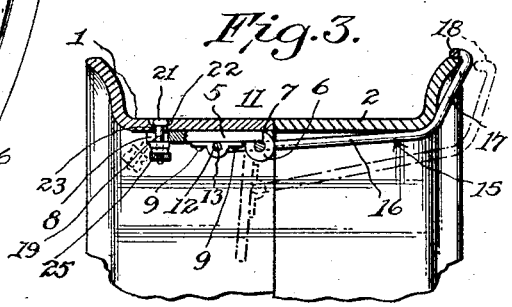
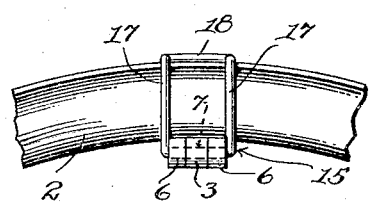
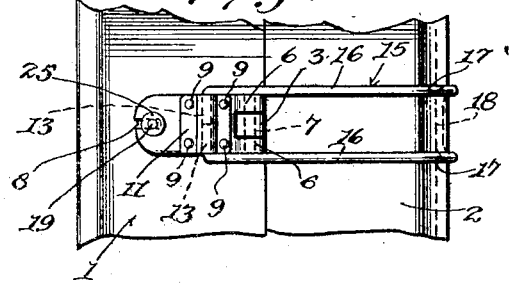
Inventor  
Eugene Reynolds  
Semmes & Semmes  
Attorneys Patented May 31, 1927.

1,630,636

UNITED STATES PATENT OFFICE.

EUGENE REYNOLDS, OF ALBUQUERQUE, NEW MEXICO.

DEMOUNTABLE RIM.

Application filed March 31, 1924. Serial No. 703,133.

My invention relates to rims, and more particularly to rims of the demountable type.

An object of my invention is to provide a demountable rim from which the tire may be quickly and readily removed without complicated tools.

A further object of my invention is to provide a demountable rim which is strong and sturdy in construction, and which will not be easily injured by use.

Yet another object of my invention is to provide a demountable rim which is easily constructed, with but few operating parts, at a cost but slightly above that of the ordinary rim of the non-demountable type.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Figure 1 is a perspective view of my rim assembled;

Fig. 2 is a detail view partly in section, showing the rim sections apart from each other, and the holding device in inoperative position;

Fig. 3 is a detail view partly in section, taken on the line 3—3 of Fig. 1 looking in the direction of the arrows, showing the rim sections together and the holding device in operative position; the dotted lines showing the position of the parts in fastening the holding device in place;

Fig. 4 is a detail plan view of the holding device;

Fig. 5 is a detail side elevation of the holding device, showing the construction of the grappling link.

Referring to the drawings for a more detailed description, I have shown a demountable rim comprising a rim circumferentially split into two approximately equal sections 1 and 2. The section 1 is provided with pivoting lugs 3, which may be welded to or integrally formed with the longitudinally split rim section 1. The pivoting lugs 3 are provided with central apertures 4. I have indicated that the rim section 1 is provided with three pivoting lugs 3, and have found that three holding devices, which are pivotally attached to the pivoting lugs and which will later be described, are sufficient under ordinary conditions to hold my rim sections firmly in place. The three pivoting lugs 3 are spaced 120° apart on the inner periphery of the rim section 1.

Each holding device comprises a lever 5 provided with two upturned lugs 6. The upturned lugs 6 are adapted to curl around a hinge pintle 7, which passes through the aperture 4 of the pivoting lug 3. The lever 5 is thus firmly hinged to the rim section 1. The lever 5 comprises a substantially flat metallic piece having formed in its free end a slot 8. Mounted on the flat surface of the lever 5, and firmly held thereto by rivets 9 is a holding plate 11 formed with an opening 12 therein.

The ends 13 of a bar 15 fit into the opening 12. The bar 15 is bent to form two parallel sides 16, and in the position shown in Fig. 3, the bar 15 is bent to embrace the rim section 2, and passes along the flange at 17. Where the bar 15 forms a loop, as at 18, the end is bent to form a hook which is adapted to engage with the periphery of the flange of the rim section 2 when the lever 5 lies flat against the rim section 1.

I designate this constructon of the bar 15 as a grappling link, since it serves this purpose and cooperates with the lever 5 to hold the rim sections together.

In order to hold the lever 5 flat against the inner periphery of the rim section 1, and to maintain it in that position to hold the grappling link in place to firmly grapple the rim sections together, I have provided a bolt 19 provided with a rounded head 21. The rounded head 21 fits within a cutout portion 22 formed on the outer periphery of the rim section 1. By outer periphery of the rim section 1, I mean that portion of the rim section 1 over which the tire (not shown) is adapted to lie. The bolt 19 passes through an aperture 23, slightly enlarged to permit the bolt to be readily swung. The bolt may then be pivoted in the depression 22. The bolt is provided with screw-threads 24 and a knurled knob or nut 25 is adapted to travel on the screw-threads 24.

In operation, the rim sections 1 and 2 are placed together and the knurled nut 25 is loosened. The bolt is then swung into the position shown in dotted lines in Figure 3, permitting the lever 5 to pivot and fall into the position shown in dotted lines in Fig. 3. The grappling link 15 can then be readily put in place with its hook 18 passing over the flange of the rim 2. The lever 5 can then be readily depressed until it lies flat against the inner periphery of the rim section 1. The bolt is then swung into position within the slot 8 and the knurled nut 25 tightened to hold the lever in place.

By reason of the fact that my holding means is so adjusted that the greatest strain on the grappling link does not take place until the lever 5 is almost flat against the inner periphery of the rim section 1, great force can be exerted by the lever 5 upon the grappling link to hold the sections tightly together. There is a toggle lever action which exerts great force on the grappling link, and once the lever is in place and fastened, the rim sections are very firmly held together.

The construction is simple and cheap. The grappling link may be made of spring steel and does not have to be of heavy construction. I have stated that the grappling link is made of a bar of metal, but it may be properly described as a thick wire rather than a bar, for the double strength which I obtain by bending the bar or wire upon itself to form the grappling link, does away with the necessity of heavy construction.

The three holding means separated at a distance of 120° firmly lock the rim sections in place. I may use more holding means for the rim sections if desired, but have found that in ordinary use three are sufficient.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:—

1. A demountable rim comprising a pair of circumferentially divided rim sections, a plurality of levers each pivotally attached at one end to one rim section and having a split in the other end, a grappling link pivoted to each lever for engagement with the other rim section, and locking means cooperating through the splits with the levers to hold them in a locked position.

2. A demountable rim comprising a pair of circumferentially divided rim sections, a plurality of levers each pivotally attached at one end to one rim section and having a split in the other end, a grappling link pivoted to each lever for engagement with the other rim section, a plurality of bolts attached to the first mentioned rim section and adapted to pass through the splits in the levers, and nuts cooperating with the bolts to hold the levers in locking position.

3. A demountable rim comprising a pair of circumferentially divided rim sections, a plurality of levers each pivotally attached at one end to one rim section and having a split in the other end, a grappling link pivoted to each lever for engagement with the other rim section, a plurality of bolts attached to the first mentioned rim section adapted to swing therein and to pass through the splits in the levers, and nuts cooperating with the bolts to hold the levers in locking position.

4. A demountable rim comprising a pair of circumferentially divided rim sections, a plurality of levers each pivotally attached at one end to one rim section and having a split in the other end, a grappling link pivoted to each lever comprising a single bar bent on itself, a hook on the links formed by bending the bars, and locking means cooperating with the splits in the levers to hold them in locking position.

5. A demountable rim comprising a pair of circumferentially divided rim sections, a plurality of levers each pivotally attached at one end to one rim section and having a split in the other end, a grappling link pivoted to each lever comprising a single bar bent on itself, hooks on the link formed by bending the bars, a plurality of bolts attached to said first mentioned rim section adapted to pass through the splits in the levers, the ends cooperating with the bolts to hold the levers in locking position.

In testimony whereof I affix my signature.

EUGENE REYNOLDS.